United States Patent
Ogawa et al.

(10) Patent No.: US 12,283,800 B2
(45) Date of Patent: Apr. 22, 2025

(54) WIRE HARNESS MANUFACTURING METHOD, WIRE HARNESS, PROTECTIVE MEMBER ASSEMBLY, AND PROTECTIVE MEMBER

(71) Applicant: YAZAKI CORPORATION, Tokyo (JP)

(72) Inventors: Masayoshi Ogawa, Toyota (JP); Satoshi Yokoyama, Toyota (JP); Hirotada Suyama, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 181 days.

(21) Appl. No.: 18/350,696

(22) Filed: Jul. 11, 2023

(65) Prior Publication Data

US 2024/0039256 A1 Feb. 1, 2024

(30) Foreign Application Priority Data

Jul. 27, 2022 (JP) ................................. 2022-119340

(51) Int. Cl.
 *H02G 3/04* (2006.01)
 *H01B 7/00* (2006.01)
(52) U.S. Cl.
 CPC ......... *H02G 3/0406* (2013.01); *H01B 7/0045* (2013.01)

(58) Field of Classification Search
CPC ...... H02G 3/0406; H02G 3/32; H01B 7/0045; H01B 7/40; H01B 13/01272; H01B 13/012; B60R 6/0215
See application file for complete search history.

(56) References Cited

U.S. PATENT DOCUMENTS

| | | | |
|---|---|---|---|
| 5,401,905 A * | 3/1995 | Lesser ..................... | H02G 3/26 174/101 |
| 9,991,028 B2 * | 6/2018 | Montalvo ............ | H02G 3/0487 |
| 2022/0392671 A1 * | 12/2022 | Goto .................... | B60R 16/0215 |
| 2023/0042263 A1 * | 2/2023 | Inoue ..................... | B60K 35/50 |

FOREIGN PATENT DOCUMENTS

JP 2016-134953 A 7/2016

* cited by examiner

*Primary Examiner* — Paresh Paghadal
(74) *Attorney, Agent, or Firm* — KENEALY VAIDYA LLP (57) ABSTRACT

A wire harness manufacturing method includes: an insertion step of inserting a binding member through an insertion hole of a protective member; a temporary retention step of inserting the binding member through a temporary retention notch in a state where the binding member is inserted through the insertion hole, and hooking the binding member, which is in a state of being inserted through the temporary retention notch, to the temporary retention projection to achieve temporary retention of the binding member on the temporary retention projection; a routing step of routing a wiring member in a routing space in a state where the binding member is temporarily retained on the temporary retention projection; and a binding step of detaching the binding member.

7 Claims, 10 Drawing Sheets

WIRE HARNESS MANUFACTURING METHOD, WIRE HARNESS, PROTECTIVE MEMBER ASSEMBLY, AND PROTECTIVE MEMBER

CROSS-REFERENCE TO RELATED APPLICATION(S)

The present application claims priority to and incorporates by reference the entire contents of Japanese Patent Application No. 2022-119340 filed in Japan on Jul. 27, 2022.

BACKGROUND OF THE INVENTION

1. Field of the Invention

The present invention relates to a wire harness manufacturing method, a wire harness, a protective member assembly, and a protective member.

2. Description of the Related Art

For example, Japanese Patent Application Laid-open No. 2016-134953 discloses a wire harness protector including a notch for inserting a mounting member in a part of each side of a protector body in a width direction.

Meanwhile, in the above-described wire harness protector in JP 2016-134953 A, there is an exemplary case where a wiring member is bound via a notch by winding a binding member such as a binding band as an attachment member. In such a case, there is room for further improvement in terms of enhancement in workability and the like.

SUMMARY OF THE INVENTION

The present invention has been made in view of the above circumstances, and aims to provide a wire harness manufacturing method, a wire harness, a protective member assembly, and a protective member capable of appropriately binding a wiring member.

To achieve the object of the present invention, a wire harness manufacturing method according to one aspect of the present invention includes an insertion step of inserting a binding member through an insertion hole of a protective member, the protective member including: a main body that forms a routing space in which the wiring member is routed and has an opening that is open to one side in a first direction in the routing space; the insertion hole being a hole that is formed to penetrate the main body and through which the binding member can be inserted across inside and outside of the routing space; a temporary retention notch that is formed in a recessed shape at an end of the main body on a side of the opening in the first direction and allows insertion of the binding member in a state where the binding member is inserted through the insertion hole; and a temporary retention projection that is formed to protrude from the main body toward a side of the temporary retention notch and capable of hooking and temporarily retaining the binding member in a state where the binding member is inserted through the temporary retention notch; a temporary retention step of inserting the binding member, which is in a state of being inserted through the insertion hole, through the temporary retention notch and hooking the binding member, which is in a state of being inserted through the temporary retention notch, onto the temporary retention projection to achieve temporary retention of the binding member on the temporary retention projection; a routing step of routing the wiring member in the routing space in a state where the binding member is temporarily retained on the temporary retention projection; and a binding step of detaching the binding member, which is in a state of being temporarily retained by the temporary retention projection, from the temporary retention projection and binding the wiring member, which is in a state of being routed in the routing space, to the main body by the binding member.

To achieve the object of the present invention, a wire harness according to another aspect of the present invention includes a wiring member; a protective member in which the wiring member is routed; and a binding member that binds the wiring member, which is routed inside the protective member, to the protective member, wherein the protective member includes: a main body forming a routing space in which the wiring member is routed and having an opening that is open to one side in a first direction in the routing space; an insertion hole which is formed to penetrate the main body and through which the binding member is inserted across inside and outside of the routing space; a temporary retention notch that is formed in a recessed shape at an end of the main body on the opening side in the first direction and that allows insertion of the binding member in a state where the binding member is inserted through the insertion hole; and a temporary retention projection that is formed so as to protrude from the main body toward the temporary retention notch and is capable of hooking and temporarily retaining the binding member in a state where the binding member is inserted through the temporary retention notch.

To achieve the object of the present invention, a protective member assembly according to still another aspect of the present invention includes a protective member in which a wiring member can be routed; and a binding member capable of binding the wiring member, which is routed inside the protective member, to the protective member, wherein the protective member includes: a main body forming a routing space in which the wiring member is routed and having an opening that is open to one side in a first direction in the routing space; an insertion hole which is formed to penetrate the main body and through which the binding member is inserted across inside and outside of the routing space; a temporary retention notch which is formed in a recessed shape at an end of the main body on the opening side in the first direction and through which the binding member is inserted in a state where the binding member is inserted through the insertion hole; and a temporary retention projection that is formed so as to protrude from the main body toward the temporary retention notch and that hooks and temporarily retains the binding member in a state where the binding member is inserted through the temporary retention notch.

To achieve the object of the present invention, a protective member according to still another aspect of the present invention includes A protective member comprising: a main body forming a routing space in which the wiring member is routed and having an opening that is open to one side in a first direction in the routing space; an insertion hole that is formed to penetrate the main body and through which a binding member can be inserted across inside and outside of the routing space; a temporary retention notch which is formed in a recessed shape at an end of the main body on the opening side in the first direction and through which the binding member can be inserted in a state where the binding member is inserted through the insertion hole; and a temporary retention projection that is formed so as to protrude from the main body toward the temporary retention notch and capable of hooking and temporarily retaining the binding member in a state where the binding member is inserted through the temporary retention notch.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described below in detail with reference to the drawings. Note that the present invention is not limited by the present embodiment. Moreover, components in the following embodiment include those easily interchangeable by those skilled in the art or substantially identical.

Each drawing described below is a schematic view of the wire harness and the protective member in simplified forms. In the following description, a first direction, a second direction, and a third direction orthogonal to (intersecting with) each other are referred to as a "first direction X", a "second direction Y", and a "third direction Z", respectively. The first direction X typically corresponds to an opening direction of a routing space of the protective member, and corresponds to a height direction of the protective member, for example. The second direction Y typically corresponds to a facing direction of a pair of side walls of the protective member, and corresponds to a width direction of the protective member, for example. In addition, the third direction Z typically corresponds to a routing direction of the wiring member with respect to the protective member, and corresponds to an axial direction of the protective member, for example. Unless otherwise specified, each direction used in the following description will be given as a direction in a state where the individual units are assembled to each other.

Embodiment

Figure 1:
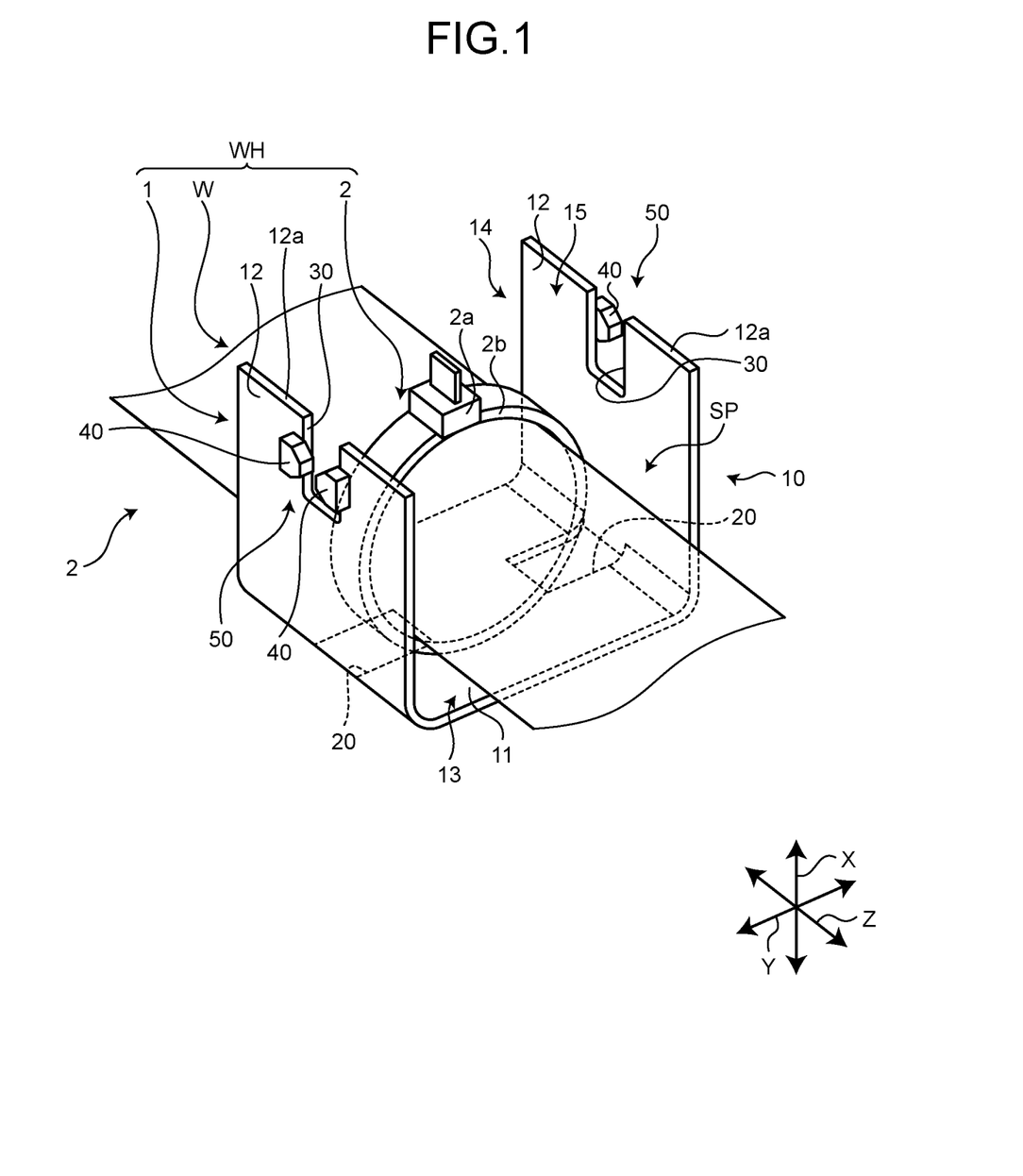
FIG. 1 is a schematic partial perspective view illustrating a schematic configuration of a wire harness according to an embodiment.

A wire harness manufacturing method according to the present embodiment is applicable to manufacturing of a wire harness WH illustrated in FIG. 1. Hereinbelow, first, the basic configuration of the wire harness WH illustrated in FIG. 1 and the like will be described, and thereafter the wire harness manufacturing method will be described in detail.

The wire harness WH illustrated in FIG. 1 is a component assembly formed by bundling a plurality of wiring members W used for power supply and signal communication so as to achieve connection between devices mounted on a vehicle, with the plurality of wiring members W connected to each of the devices via connectors or the like. The wire harness WH of the present embodiment includes a wiring member W, a protective member 1, and a binding member 2. The wire harness WH may further include various other components such as a grommet, an electrical connection box, a fixture, and a connector.

The wiring member W is, for example, an insulated wire in which a core wire, which is a bundle of a plurality of conductive metal element wires, is covered with an insulating coating. The wiring member W may be a bundle of a plurality of insulated wires. In addition, the wiring member W may be an insulating metal rod which is a conductive metal rod covered with an insulating coating. The protective member 1 is incorporated in the wire harness WH, and internally includes the inserted and routed wiring member W to allow the protective member 1 to be externally provided on the wiring member W, thereby protecting the wiring member W routed inside and regulating the routing path of the wiring member W. The protective member 1 is also referred to as an exterior member or a protector. Here, the routing path of the wiring member W in the protective member 1 will be described as a path formed in a straight line shape in the third direction Z, but is not limited thereto, and may be a curved or bent path. The binding member 2 binds the wiring member W, which is routed inside the protective member 1, to the protective member 1. The binding member 2 is member referred to as a binding band, and includes a head portion 2a and a band portion 2b extending from the head portion 2a. The band portion 2b, which is wound around the wiring member W and the protective member 1, is locked to the head portion 2a, allowing the binding member 2 to bind and fix the wiring member W to the protective member 1.

In the wire harness WH illustrated in the present embodiment, the protective member 1 has a temporary retention notch 30 and a temporary retention projection 40 formed for temporary retention of the band portion 2b of the binding member 2, leading to enhancement of the workability at the time of routing and bundling the wiring member W when the wiring member W is routed inside the protective member 1. Hereinafter, a configuration of the protective member 1 will be described in detail with reference to the drawings.

Figure 2:
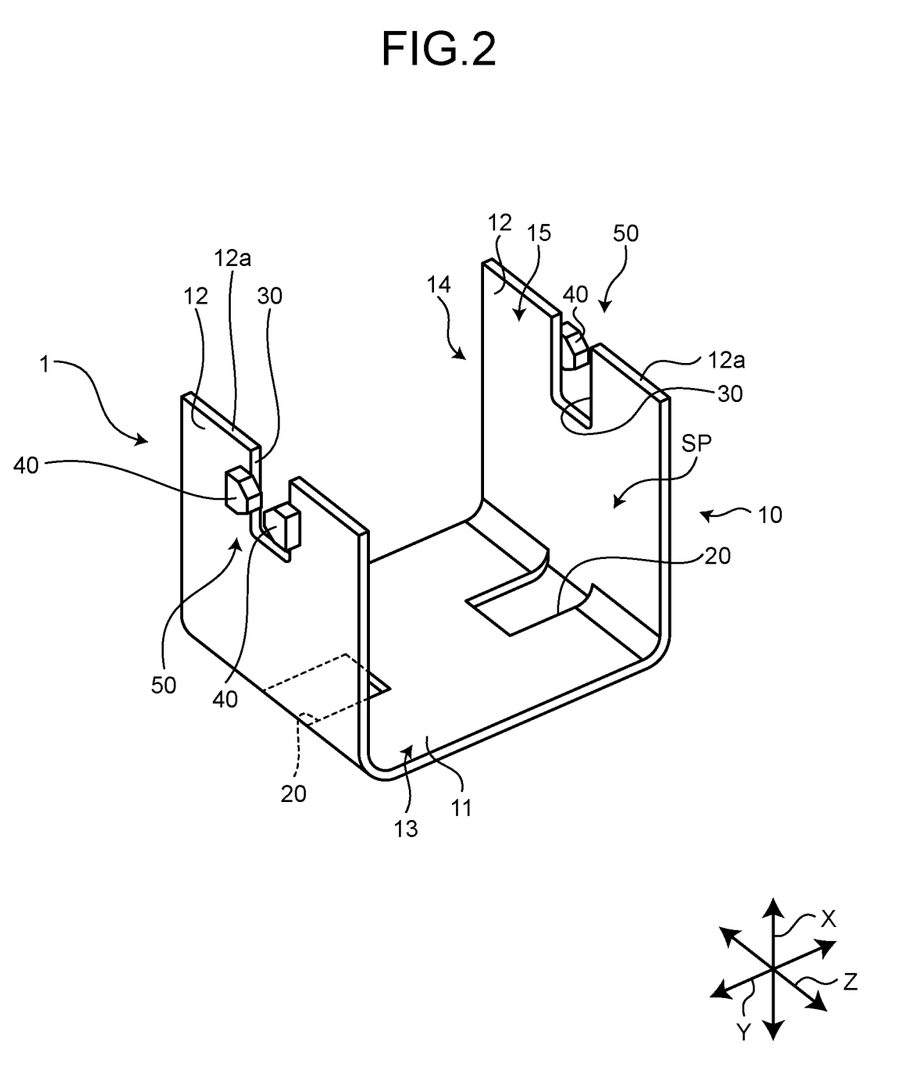
FIG. 2 is a schematic partial perspective view illustrating a schematic configuration of a protective member of the wire harness according to the embodiment.
Figure 3:
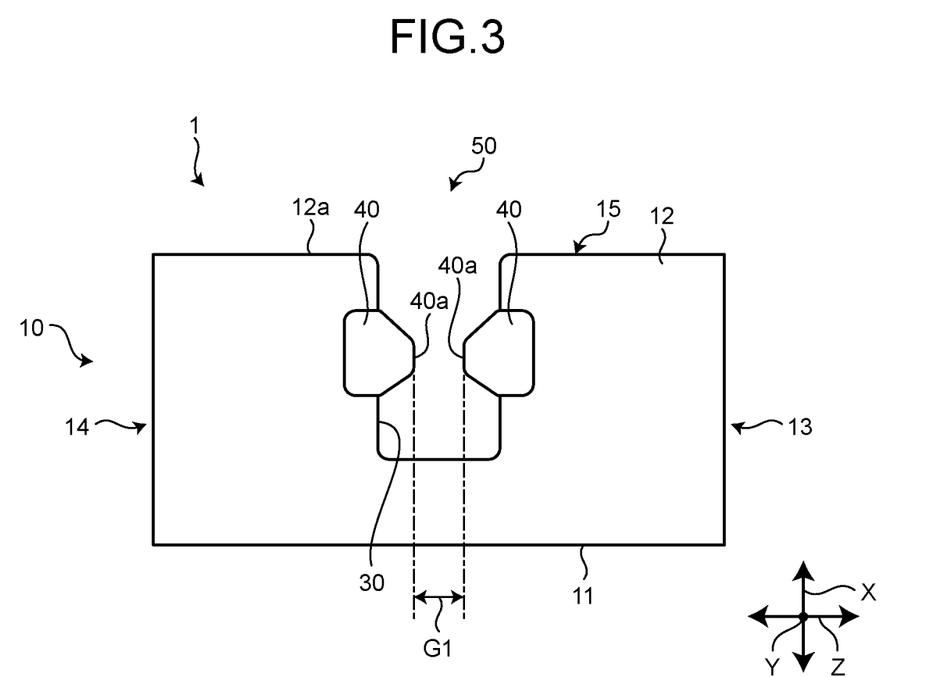
FIG. 3 is a schematic partial side view illustrating a schematic configuration of the protective member of the wire harness according to the embodiment.

Specifically, as illustrated in FIGS. 1, 2, and 3, the protective member 1 includes a main body 10, an insertion hole 20, a temporary retention notch 30, and a temporary retention projection 40. In the protective member 1, the main body 10, the insertion hole 20, the temporary retention notch 30, and the temporary retention projection 40 are integrally molded using an insulating resin material.

The main body 10 constitutes a main member that protects the wiring member W routed inside and regulates the routing path in the protective member 1. The main body 10 is formed in a substantially gutter shape to internally include the routing space SP. Specifically, the main body includes a bottom 11 and a side wall 12. The bottom 11 10 is formed in a plate shape having a plate thickness direction running in the first direction X. The bottom 11 is formed in a shape corresponding to the required shape of the routing space SP, and extends as a straight line in the third direction Z here. The side wall 12 is formed in a plate shape protruding from the bottom 11 to one side in the first direction X. Here, the side wall 12 is provided as a pair at intervals in the second direction Y. The side walls 12 are individually provided at ends of the bottom 11 in the second direction Y.

In the main body 10, an internal space surrounded by the bottom 11 and the pair of side walls 12 constitutes a routing space SP. The routing space SP is a space through which the wiring member W is inserted and in which the wiring member W is located, constituting a routing path in a straight line shape by the bottom 11 and the pair of side walls 12.

In addition, in the main body 10, the bottom 11 and the pair of side walls 12 form a pair of routing ports 13 and 14 and an opening 15. The routing ports 13 and 14 are apertures through which the wiring member W routed in the routing space SP is inserted, and are formed at both ends in the third direction Z in the main body 10. The routing ports 13 and 14 are both formed by the bottom 11 and ends of the pair of side walls 12 in the third direction Z, and are open in the third direction Z. The opening 15 is an aperture for routing the wiring member W in the routing space SP, and is formed in the main body 10 so as to face the bottom 11 in the first direction X. The opening 15 is formed by ends of the pair of side walls 12 on the side opposite to the bottom 11 side, and opens to the side opposite to the bottom 11 in the first direction X. That is, the main body 10 has the opening 15 open to one side in the first direction X in the routing space SP.

The protective member 1 may separately include a cover member that closes the opening 15 of the main body 10 after the wiring member W is routed in the routing space SP and bound and fixed by the binding member 2.

The insertion hole 20 is a hole formed to penetrate the main body 10 so as to allow the binding member 2 to be inserted through the routing space SP. The insertion hole 20 is provided to be positioned on the routing path of the wiring member W in the routing space SP. That is, here, the insertion hole 20 is provided to be positioned on the routing path formed across the routing port 13 and the routing port 14, and also provided is the binding member 2 for binding and fixing the wiring member W, which is routed in the routing path, to the main body 10. The insertion hole 20 is provided at a portion sandwiched between the pair of side walls 12 in the bottom 11 of the main body 10. The insertion hole 20 is formed to penetrate the bottom 11 in the first direction X so as to connect through the inside and the outside of the routing space SP. The insertion holes 20 are provided as a pair for one binding member 2. The pair of insertion holes 20 is formed in the bottom 11 at intervals in a direction intersecting the routing path of the wiring member W, here, the second direction Y. Here, the pair of insertion holes 20 is formed at individual ends of the bottom 11 on the side walls 12 side, and each is formed in a substantially rectangular shape that allows insertion of the band portion 2b of the binding member 2. Here, the pair of insertion holes 20 is formed at positions facing each other in the second direction Y, but may be formed at positions shifted from each other in the third direction Z within a range that allows insertion of one binding member 2.

The temporary retention notch 30, which is formed in a recessed shape at an end 12a of the main body 10 on the opening 15 side in the first direction X, is a notch that allows insertion of the binding member 2 across the inside and outside of the routing space SP in a state where the binding member 2 is inserted through the insertion hole 20. The temporary retention notch 30 constitutes a temporary retainer 50 together with the temporary retention projection 40. The temporary retainer 50 is a portion that can temporarily retain the end of the band portion 2b of the binding member 2 in a state where the binding member 2 is inserted through the insertion hole 20.

Specifically, the temporary retention notch 30 is formed at the end 12a of the side wall 12 constituting the main body 10 on the opening 15 side in the first direction X. The temporary retention notch 30 is formed to extend in the first direction X in a recessed shape from the end 12a of the side wall 12 in the first direction X toward the bottom 11. In other words, the temporary retention notch 30 is formed to penetrate the side wall 12 in the second direction Y so as to connect through the inside and the outside of the routing space SP. Each one piece of the temporary retention notches 30 is provided corresponding to one piece the pair of side walls 12, so as to be provided as a pair across the routing space SP in the second direction Y. The pair of temporary retention notches 30 is formed at intervals in a direction intersecting with the routing path of the wiring member W, that is, in the second direction Y, so as to be positioned across the pair of insertion holes 20 in the second direction Y. Here, each one piece of the pair of the temporary retention notches 30 is formed at each end 12a of each side wall 12 in the first direction X, so as to be formed in a substantially rectangular shape that allows insertion of the band portion 2b of the binding member 2. Furthermore, here, the pair of temporary retention notches 30 is formed at positions facing each other in the second direction Y, but may be formed at positions shifted from each other in the third direction Z within a range capable of inserting each end of the binding member 2 in the state of being inserted through the insertion hole 20.

The temporary retention projection 40 is a projection formed so as to protrude from the main body 10 toward the temporary retention notch 30 to enable hooking and temporary retention of the binding member 2 in a state where the binding member 2 is inserted through the temporary retention notch 30. As described above, the temporary retention projection 40 constitutes the temporary retainer 50 together with the temporary retention notch 30.

Specifically, the temporary retention projection 40 is formed on the side wall 12 constituting the main body 10. More specifically, the temporary retention projection 40 is formed to protrude from the side wall 12 toward the inside of the temporary retention notch 30 as viewed in the second direction Y (in other words, in a front view of the temporary retention notch 30,). Here, the temporary retention projection 40 protrudes outward in the second direction Y from the outer surface of the side wall 12 (surface opposite to the routing space SP side), and protrudes toward the temporary retention notch 30 in the third direction Z to be formed in a claw shape. Using its claw shape, the temporary retention projection 40 enables hooking and temporary retention of the band portion 2b of the binding member 2. The temporary retention projection 40 is provided as a pair to face each other across the temporary retention notch 30 in the third direction Z.

One of the pair of temporary retention projections 40 is located on one side in the third direction Z with respect to the temporary retention notch 30, and protrudes from an edge of the side wall 12 forming the temporary retention notch 30 to the other side in the third direction Z. The other of the pair of temporary retention projections 40 is located on the other side in the third direction Z with respect to the temporary retention notch 30, and protrudes to the one side in the third direction Z from an edge of the side wall 12 forming the temporary retention notch 30.

Each temporary retention projection 40 is formed in a tapered shape toward the protrusion end 40a. The protrusion ends 40a of the pair of temporary retention projections 40 are positioned at an interval G1 in the third direction Z to such an extent to allow passage of the band portion 2b of the binding member 2. In other words, in each temporary retention projection 40, a protrusion amount in the third direction Z from the edge of the side wall 12 is set to a protrusion amount such that the interval G1 between the protrusion ends 40a in the third direction Z is an interval that allows passage of the band portion 2b.

Here, the pair of temporary retention projections 40 constitutes one temporary retainer 50. That is, one temporary retainer 50 includes one temporary retention notch 30 and one pair of temporary retention projections 40. In addition, as described above in the description of the pair of temporary retention notches 30, one temporary retainer 50 is provided for each of the pair of side walls 12, so as to be provided as a pair across the routing space SP in the second direction Y. That is, the combination of the temporary retention notch 30 and the temporary retention projection 40 constituting the temporary retainer 50 is provided as a pair across the routing space SP in the second direction Y.

Next, a method of manufacturing the wire harness WH (wire harness manufacturing method) having the above configuration will be described with reference to FIGS. 1, 4, 5, 6, and 7. The following description will be given based on a flowchart of FIG. 4 with reference to other drawings as appropriate. The method of manufacturing the wire harness WH described below may be manually performed by an operator using various devices, apparatuses, jigs, and the like, or may be automatically performed by various manufacturing devices.

Figure 4:
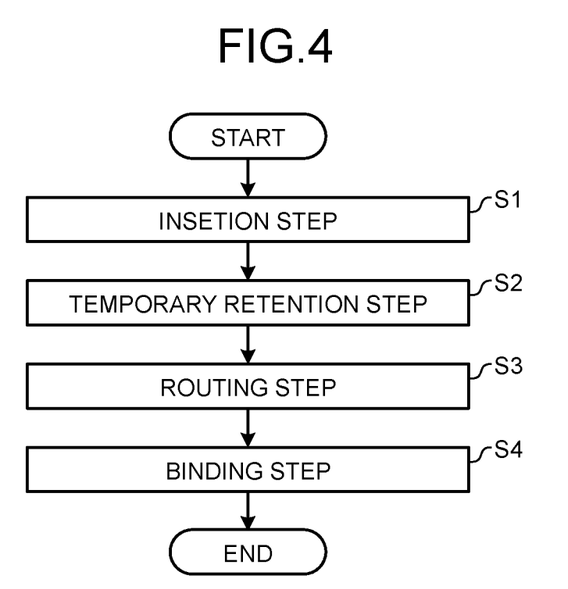
FIG. 4 is a flowchart illustrating a wire harness manufacturing method according to the embodiment.

The method of manufacturing the wire harness WH of the present embodiment includes an insertion step (step S1), a temporary retention step (step S2), a routing step (step S3), and a binding step (step S4). Here, the description will be given assuming that the method of manufacturing the wire harness WH is manually performed by an operator.

Figure 5:
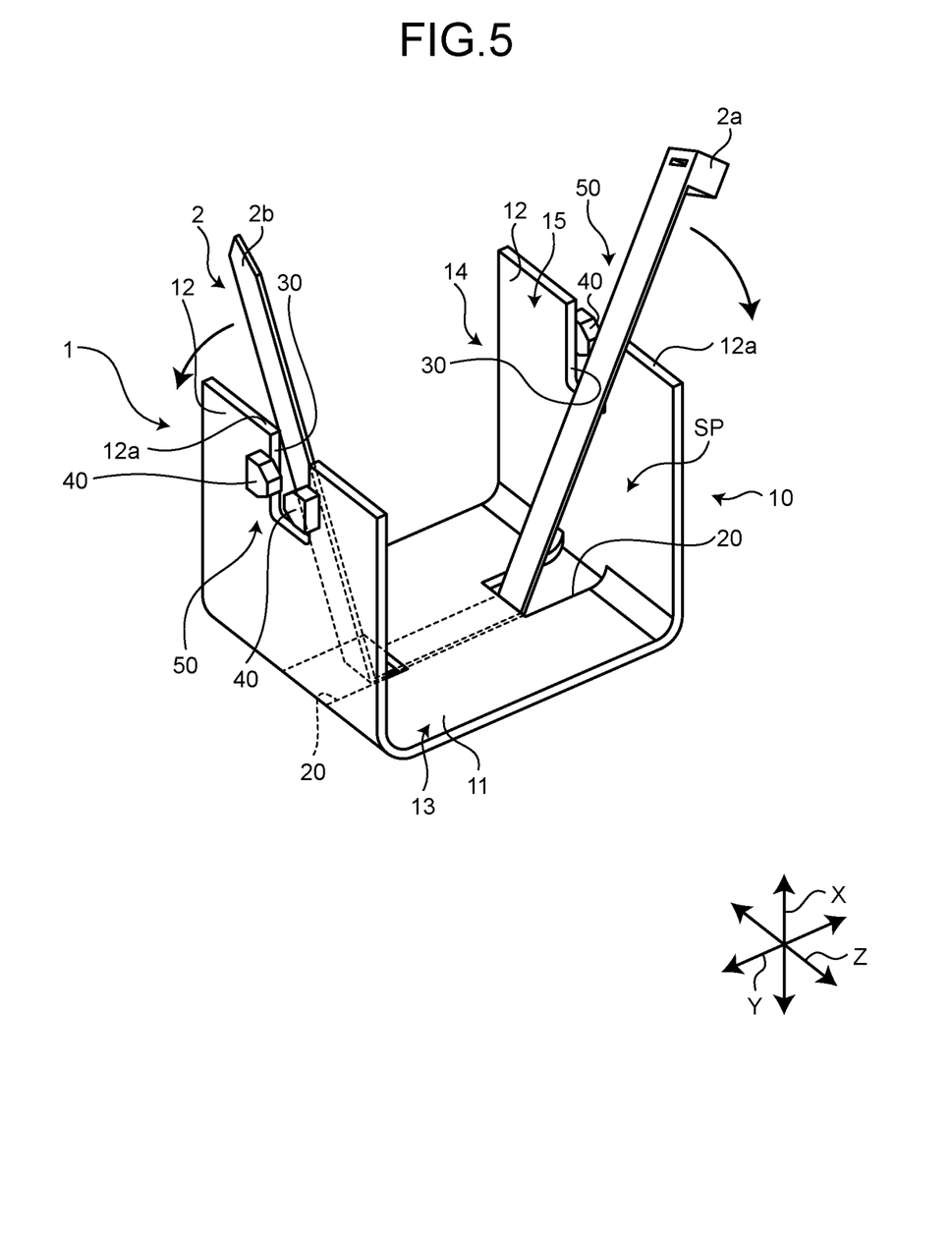
FIG. 5 is a schematic partial perspective view illustrating the wire harness manufacturing method according to the embodiment.

First, as the insertion step, the operator inserts the binding member 2 into the insertion hole 20 as illustrated in FIG. 5 (step S1). Here, regarding the binding member 2, the distal end of the band portion 2b is inserted through one insertion hole 20 of the pair of insertion holes 20 from the routing space SP side. Thereafter, the binding member 2 is inserted such that a distal end of the band portion 2b is folded back outside the routing space SP, and the distal end of the band portion 2b is inserted through the other insertion hole 20 toward the routing space SP. Currently, the binding member 2 is in a state in which the band portion 2b is inserted through the pair of insertion holes 20 and folded back in a substantially U shape. In this state, in the binding member 2, the distal end of the band portion 2b is located in the vicinity of one temporary retainer 50, and the end on the head portion 2a side is located in the vicinity of the other temporary retainer 50.

Figure 6:
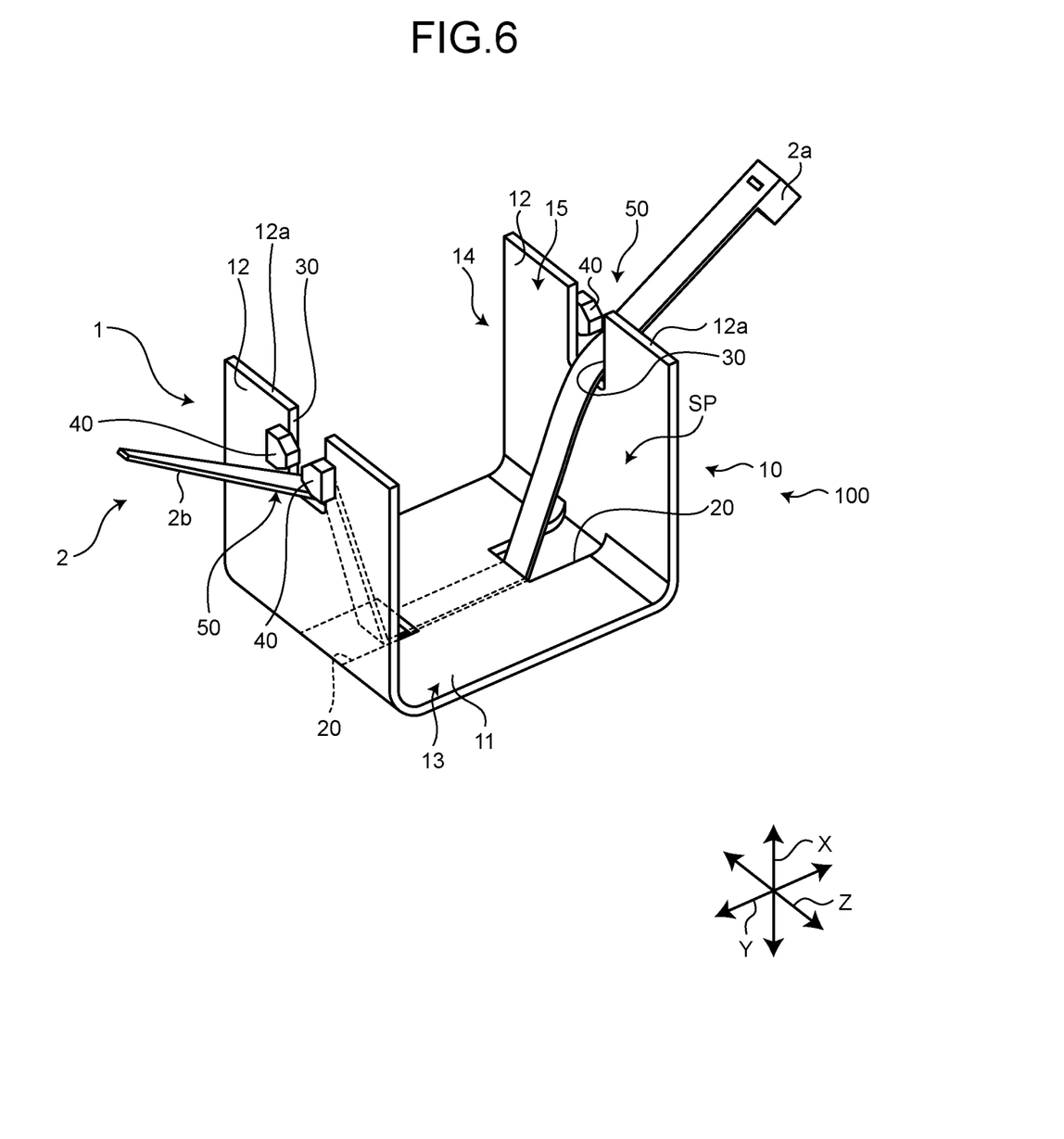
FIG. 6 is a schematic partial perspective view illustrating the wire harness manufacturing method according to the embodiment.

Next, as a temporary retention step as indicated by an arrow in FIG. 5, the operator inserts each end of the band portion 2b of the binding member 2, which is in the state of being inserted through the insertion hole 20, through the temporary retention notch 30 constituting each temporary retainer 50. Thereafter, as illustrated in FIG. 6, the operator allows each end of the band portion 2b of the binding member 2, which is inserted through the temporary retention notch 30, to be hooked on the temporary retention projection 40 constituting each temporary retainer 50 so as to temporarily retain the end of the band portion 2b on the temporary retention projection 40 (step S2). Here, the distal end side of the band portion 2b of the binding member 2 is pulled out from the routing space SP side toward one side in the first direction X via the opening 15 and is folded back to the other side in the first direction X. The folded end of the band portion 2b of the binding member 2 is pushed into and inserted through the temporary retention notch 30 constituting one temporary retainer 50 so as to be hooked on the temporary retention projection 40, achieving temporary retention of the binding member 2 on the temporary retention projection 40. Similarly, the end of the band portion 2b on the head portion 2a side is also pulled out from the routing space SP side toward the one side in the first direction X via the opening 15, and is pushed into and inserted through the temporary retention notch 30 constituting the other temporary retainer 50, so as to be hooked on the temporary retention projection 40, achieving temporary retention of the binding member 2 by the temporary retention projection 40.

In this state, the protective member 1 and the binding member 2 constitute a protective member assembly 100. That is, the protective member assembly 100 includes the protective member 1 capable of routing the wiring member W inside, and the binding member 2 capable of binding the wiring member W, which is routed inside the protective member 1, to the protective member 1. As described above, in this state, the binding member 2 is inserted through the insertion hole 20 across the inside and outside of the routing space SP, with the binding member 2 inserted through the temporary retention notch 30. The temporary retention projection 40 is in a state of hooking and temporarily retaining the binding member 2 in a state where the binding member 2 is inserted through the temporary retention notch 30.

Figure 7:
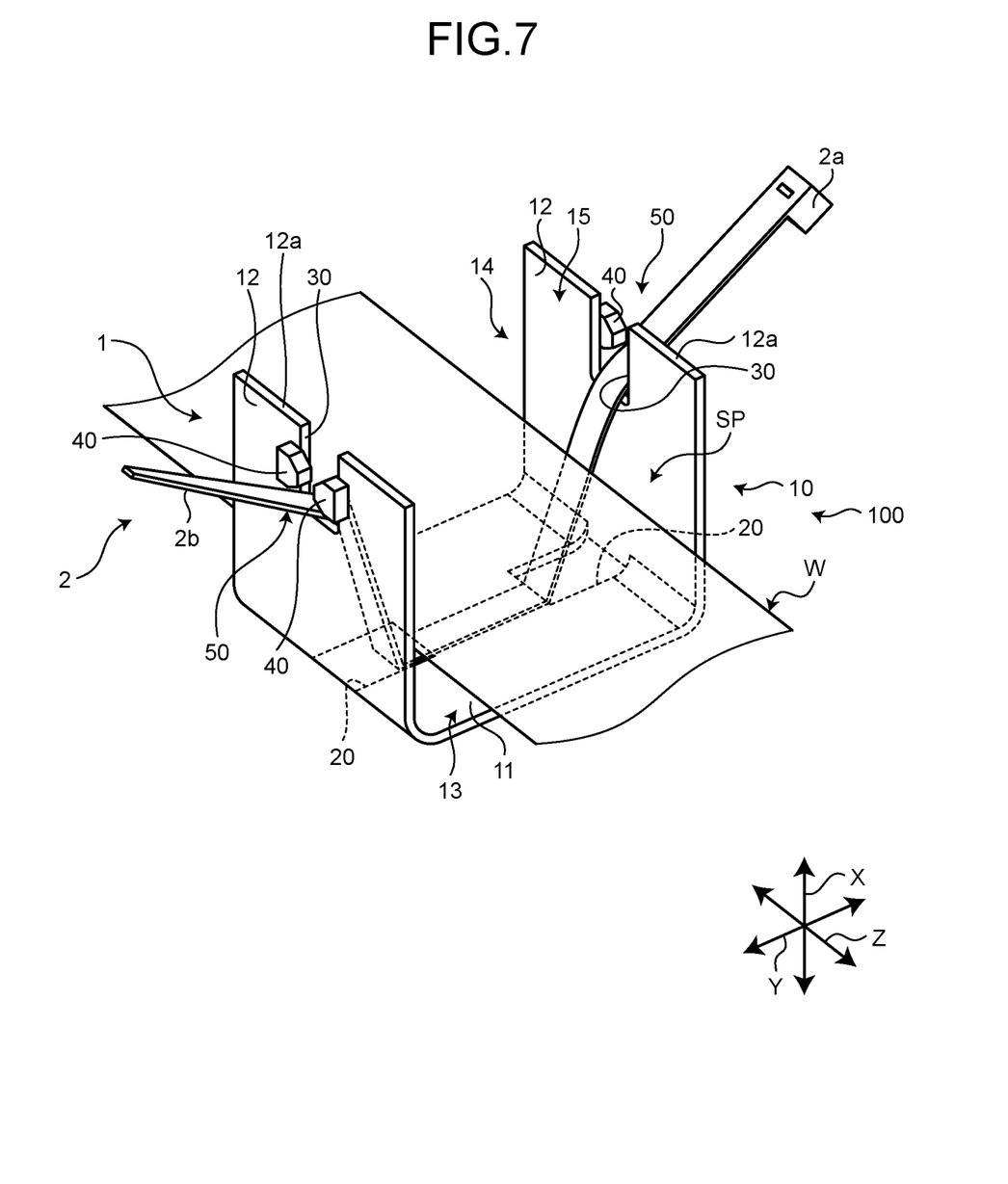
FIG. 7 is a schematic partial perspective view illustrating the wire harness manufacturing method according to the embodiment.

Next, as illustrated in FIG. 7, the operator performs, as the routing step, routing of the wiring member W in the routing space SP in a state where the binding member 2 is temporarily retained by the temporary retention projection 40 (step S3). Here, the wiring member W is accommodated in the routing space SP via the opening 15, and is routed on a routing path constituted through the routing port 13 and the routing port 14 in the routing space SP.

Next, as illustrated in FIG. 1, as a binding step, the operator detaches the end of the binding member 2, which is in a state of being temporarily retained on the temporary retention projection 40, from the temporary retention projection 40, and uses the binding member 2 to bind the wiring member W, which is in a state of being routed in the routing space SP, to the main body 10 (step S4). Here, in a state where the band portion 2b is wound around the wiring member W and the bottom 11 of the main body 10 via the insertion hole 20, the distal end of the band portion 2b is locked to the head portion 2a, allowing the binding member 2 to bind and fix the wiring member W to the bottom 11.

Now, the operator ends the method of manufacturing the wire harness WH. In this state, the binding member 2 is inserted through the insertion hole 20 across the inside and outside of the routing space SP, while the binding member 2 is detached from the temporary retention notch 30 and the temporary retention projection 40.

According to the manufacturing method, the wire harness WH, the protective member assembly 100, and the protective member 1 described above, the end of the binding member 2 in the state of being inserted through the insertion hole 20 is inserted through the temporary retention notch 30 provided in the end 12a of the main body 10 on the opening 15 side so as to achieve temporary retention of the binding member 2 on the temporary retention projection 40 before routing of the wiring member W in the routing space SP of the main body 10, making it possible to enhance the workability at the time of routing and bundling the wiring member W. That is, according to the manufacturing method, the wire harness WH, the protective member assembly 100, and the protective member 1, with the end of the binding member 2 temporarily retained on the temporary retention projection 40, it is possible to suppress a case where the end of the binding member 2 falls into the routing space SP and becomes trapped under the wiring member W when routing the wiring member W in the routing space SP. With this configuration, according to the manufacturing method, the wire harness WH, the protective member assembly 100, and the protective member 1, it is possible to prevent the binding member 2 from interfering with the routing work when routing the wiring member W in the routing space SP, and possible to suppress an occurrence of unnecessary workload such as pulling out of the binding member 2 that has become trapped under the wiring member W. In addition, according to the manufacturing method, the wire harness WH, the protective member assembly 100, and the protective member 1, after the wiring member W is routed in the routing space SP, the binding member 2 temporarily retained on the temporary retention projection 40 can be detached so as to be able to bind and fix the wiring member W to the protective member 1. As a result, the manufacturing method, the wire harness WH, the protective member assembly 100, and the protective member 1 described above can enhance workability at the time of routing and binding the wiring member W, and can properly bind the wiring member W.

Here, according to the manufacturing method, the wire harness WH, the protective member assembly 100, and the protective member 1 described above, each temporary retainer 50 includes a pair of temporary retention projections 40 to face each other across the temporary retention notch 30. This configuration makes it possible for the protective member 1 to reliably perform temporary retention of the end of the binding member 2 inserted through the temporary retention notch 30 by the pair of temporary retention projections 40. In addition, with this configuration, the protective member 1 can be provided to allow easy temporary retention of the distal end of the binding member 2 by the temporary retention projection 40 from the opening 15 side, and to allow easy detachment of the end of the binding member 2 temporarily retained by the temporary retention projection 40 from the opening 15 side. As a result, the manufacturing method, the wire harness WH, the protective member assembly 100, and the protective member 1 described above can further enhance workability at the time of routing and binding the wiring member W, and can more properly bind the wiring member W.

In addition, according to the manufacturing method, the wire harness WH, and the protective member 1 described above, the combination of the temporary retention notch 30 and the temporary retention projection 40 constituting the temporary retainer 50 is provided as a pair across the routing space SP. This configuration makes it possible for the protective member 1 to temporarily retain both ends of the binding member 2 inserted through the insertion hole 20 by the temporary retention projection 40. Also in this respect, the manufacturing method, the wire harness WH, the protective member assembly 100, and the protective member 1 described above can further enhance workability at the time of routing and binding the wiring member W, and can more properly bind the wiring member W.

The wire harness manufacturing method, the wire harness, the protective member assembly, and the protective member according to the embodiments of the present invention described above are not limited to the embodiments described above, and various modifications can be made within the scope described in the claims.

In the above description, the protective member 1 has been described as an exterior member or a protector, but the present invention is not limited thereto, and for example, the protective member 1 may be provided as a part of a housing such as a member referred to as an electrical connection box.

The above has described an example in which the temporary retention projection 40 is provided as a pair so as to face each other across the temporary retention notch 30, but the number is not limited thereto, and it is sufficient to provide at least one temporary retention projection. Similarly, the above has described an example in which the combination of the temporary retention notch 30 and the temporary retention projection 40 is provided as a pair across the routing space SP, but the number is not limited thereto, and at least one combination may be provided.

Figure 8:
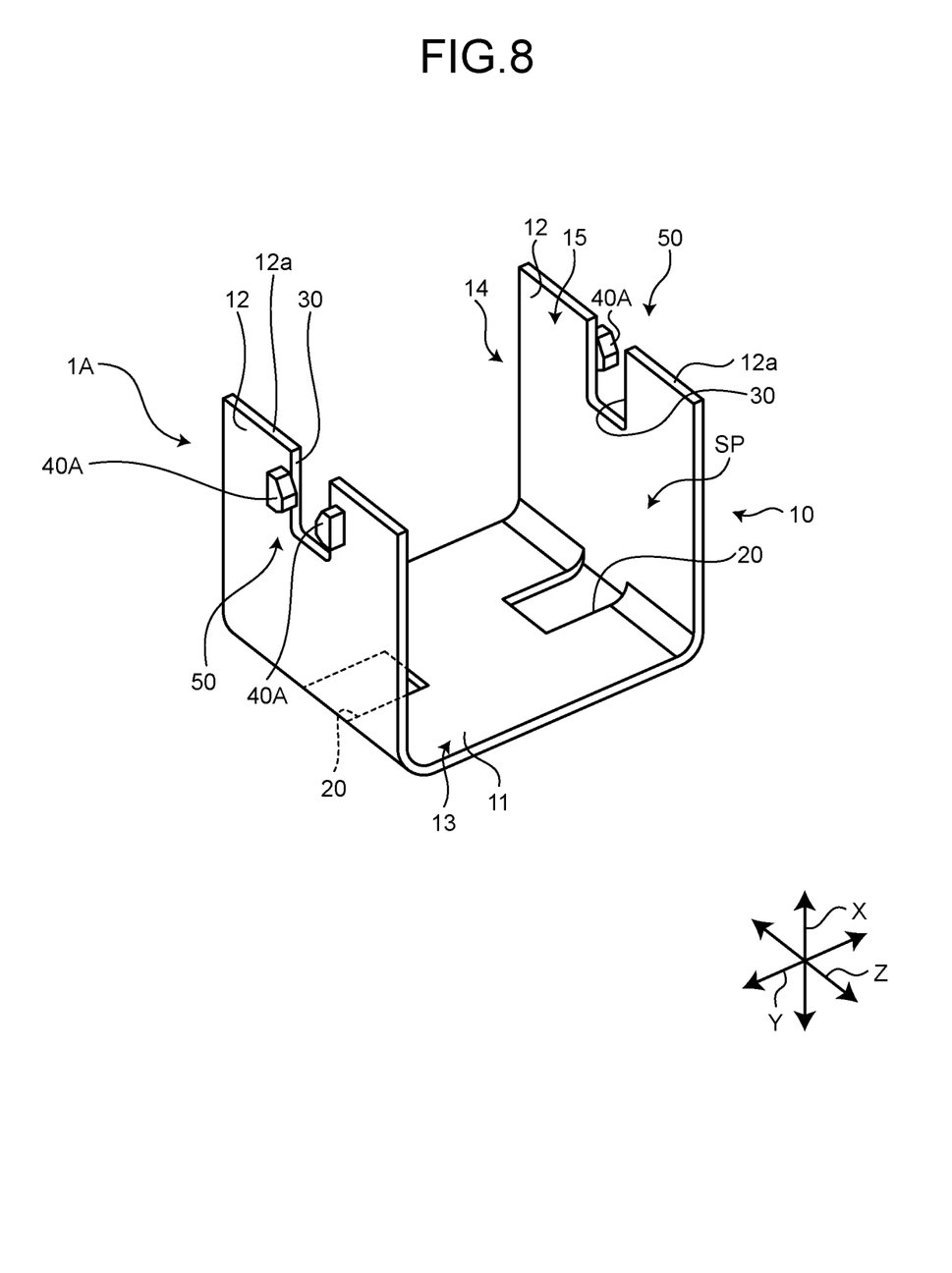
FIG. 8 is a schematic partial perspective view illustrating a schematic configuration of a protective member of a wire harness according to a modification.
Figure 9:
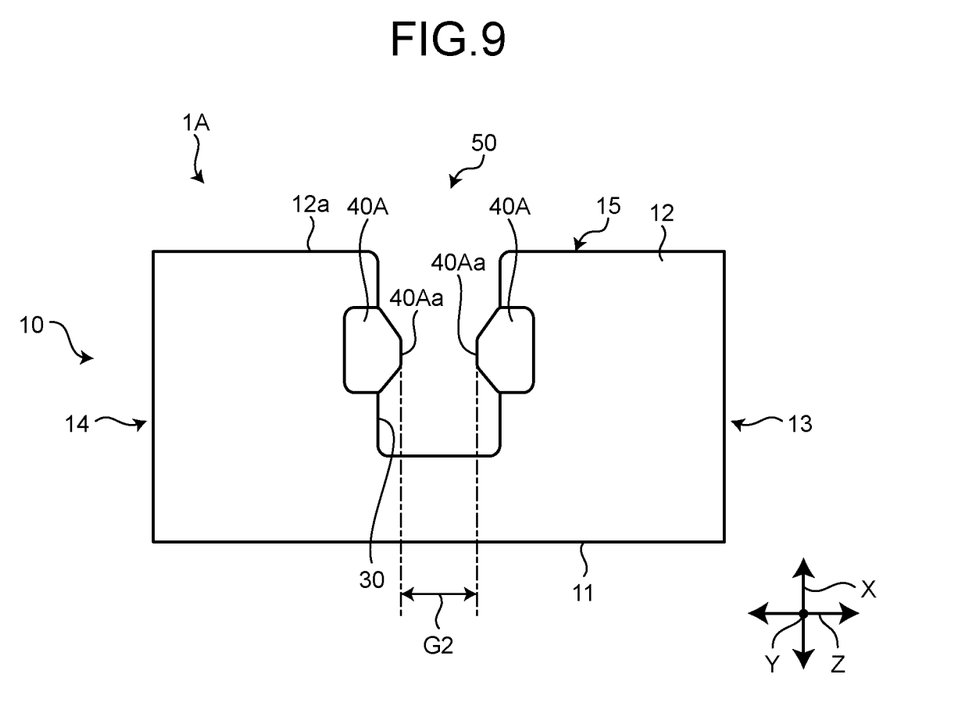
FIG. 9 is a schematic partial side view illustrating a schematic configuration of the protective member of the wire harness according to a modification.

The interval G1 between the protrusion ends 40a of the pair of temporary retention projections 40 described above may be appropriately changed according to the width of the band portion 2b of the binding member 2 applied to the protective member 1. A pair of temporary retention projections 40A included in a protective member 1A according to a modification illustrated in FIGS. 8 and 9 is formed such that an interval G2 between protrusion ends 40Aa is relatively wider than the interval G1 between the protrusion ends 40a of the pair of temporary retention projections 40 described above. That is, the protrusion end 40Aa of the pair of temporary retention projections 40A are positioned at the interval G2 in the third direction Z to such an extent to allow passage of the binding member wider than the band portion 2b of the binding member 2. In other words, in each temporary retention projection 40A, the protrusion amount in the third direction Z from the edge of the side wall 12 is set to a protrusion amount such that the interval G2 between the protrusion end 40Aa in the third direction Z is an interval that allows passage of the band portion of a relatively wide binding member. Even in this case, similarly to the above, the protective member 1A can properly bind the wiring member W, and can properly perform temporary retention of the binding member 2 according to the width of the band portion 2b of the binding member 2 applied as well.

Figure 10:
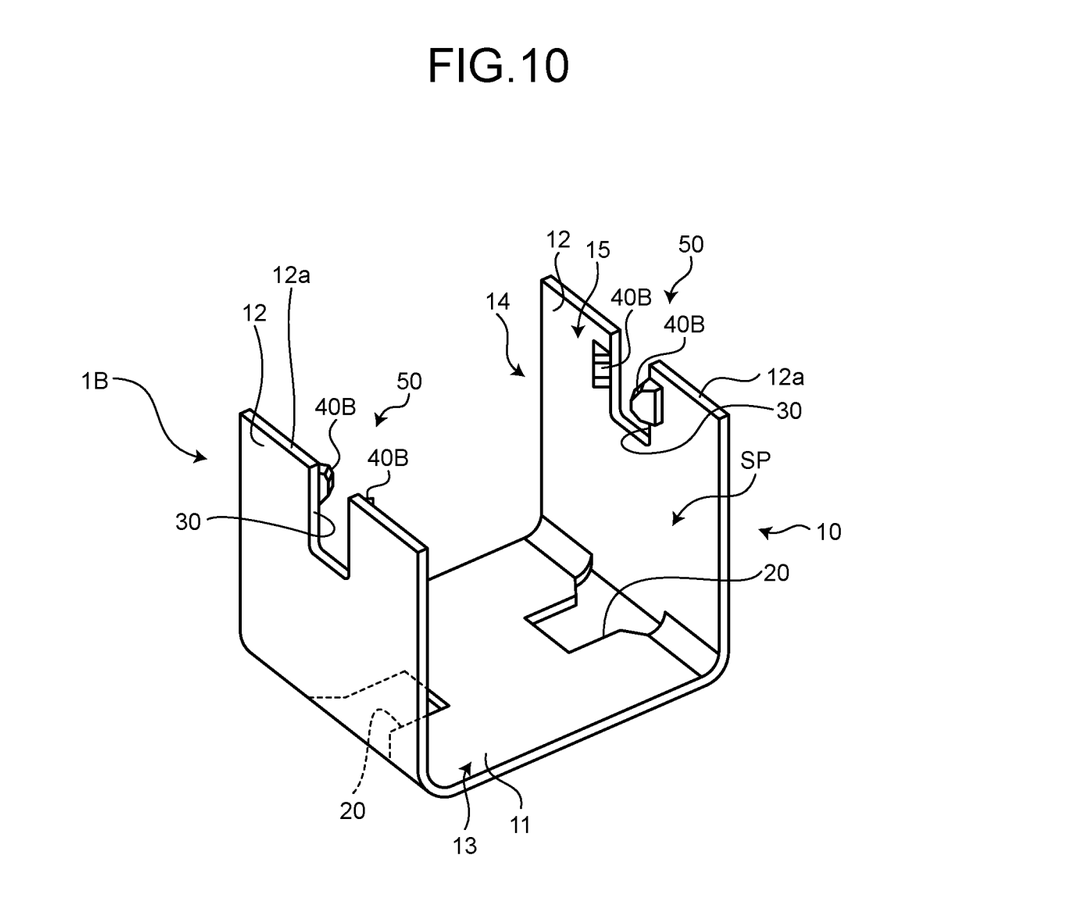
FIG. 10 is a schematic partial perspective view illustrating a schematic configuration of the protective member of the wire harness according to the modification.
Figure 11:
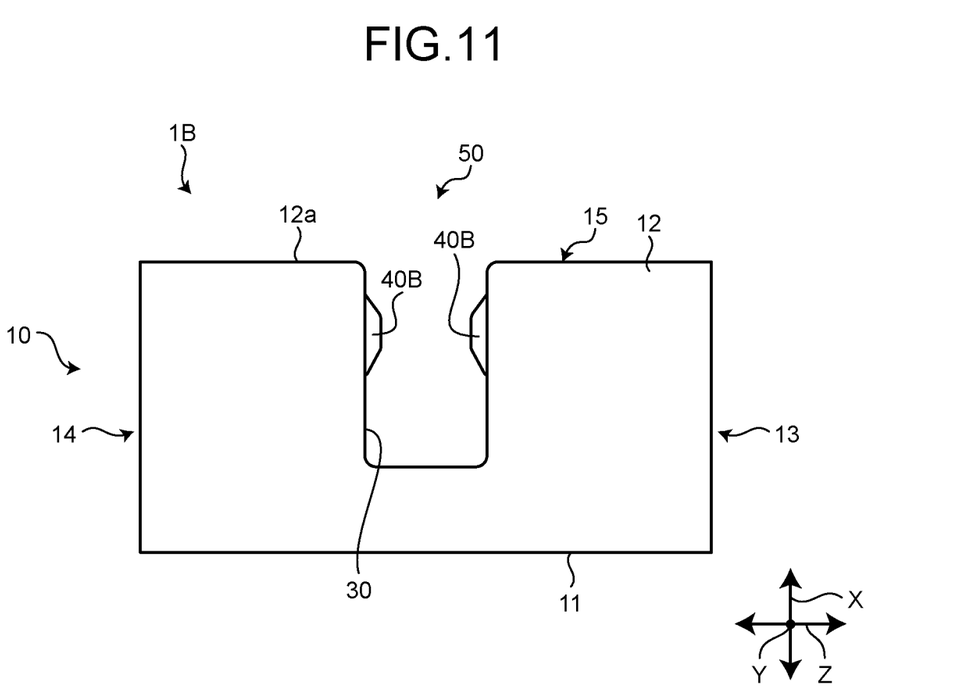
FIG. 11 is a schematic partial side view illustrating a schematic configuration of the protective member of the wire harness according to the modification.

Although the above has described an example in which the temporary retention projection 40 protrudes outward in the second direction Y from the outer surface of the side wall 12 (the surface opposite to the routing space SP side) and protrudes toward the temporary retention notch 30 in the third direction Z to be formed in a claw shape, the formation is not limited thereto. A pair of temporary retention projections 40B included in a protective member 1B according to a modification illustrated in FIGS. 10 and 11 protrudes inward in the second direction Y from an inner surface (surface on the routing space SP side) of the side wall 12 and also protrudes toward the temporary retention notch 30 in the third direction Z to be formed in a claw shape. Note that, compared with the insertion hole 20 of the above-described embodiment, the insertion hole 20 of the present modification basically has a configuration substantially similar to each other, with a slight difference in shapes. Even in this case, the protective member 1B can properly bind the wiring member W similarly to the above.

The wire harness manufacturing method, the wire harness, the protective member assembly, and the protective member according to the present embodiment may be configured by appropriately combining the components of the embodiment and the modifications described above.

The wire harness manufacturing method, the wire harness, the protective member assembly, and the protective member according to the embodiments are advantageous in the capability of appropriately binding the wiring member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness manufacturing method comprising:
an insertion step of inserting a binding member through an insertion hole of a protective member, the protective member including: a main body that forms a routing space in which the wiring member is routed and has an opening that is open to one side in a first direction in the routing space; the insertion hole being a hole that is formed to penetrate the main body and through which the binding member can be inserted across inside and outside of the routing space; a temporary retention notch that is formed in a recessed shape at an end of the main body on a side of the opening in the first direction and allows insertion of the binding member in a state where the binding member is inserted through the insertion hole; and a temporary retention projection that is formed to protrude from the main body toward a side of the temporary retention notch and capable of hooking and temporarily retaining the binding member in a state where the binding member is inserted through the temporary retention notch;
a temporary retention step of inserting the binding member, which is in a state of being inserted through the insertion hole, through the temporary retention notch and hooking the binding member, which is in a state of being inserted through the temporary retention notch, onto the temporary retention projection to achieve temporary retention of the binding member on the temporary retention projection;
a routing step of routing the wiring member in the routing space in a state where the binding member is temporarily retained on the temporary retention projection; and
a binding step of detaching the binding member, which is in a state of being temporarily retained by the temporary retention projection, from the temporary retention projection and binding the wiring member, which is in a state of being routed in the routing space, to the main body by the binding member.

2. The wire harness manufacturing method according to claim 1, wherein
the temporary retention projection is provided as a pair so as to face each other across the temporary retention notch.

3. The wire harness manufacturing method according to claim 1, wherein
a combination of the temporary retention notch and the temporary retention projection is provided as a pair across the routing space.

4. The wire harness manufacturing method according to claim 2, wherein
a combination of the temporary retention notch and the temporary retention projection is provided as a pair across the routing space.

5. A wire harness comprising:
a wiring member;
a protective member in which the wiring member is routed; and
a binding member that binds the wiring member, which is routed inside the protective member, to the protective member, wherein
the protective member includes:
a main body forming a routing space in which the wiring member is routed and having an opening that is open to one side in a first direction in the routing space;
an insertion hole which is formed to penetrate the main body and through which the binding member is inserted across inside and outside of the routing space;
a temporary retention notch that is formed in a recessed shape at an end of the main body on the opening side in the first direction and that allows insertion of the binding member in a state where the binding member is inserted through the insertion hole; and
a temporary retention projection that is formed so as to protrude from the main body toward the temporary retention notch and is capable of hooking and temporarily retaining the binding member in a state where the binding member is inserted through the temporary retention notch.

6. A protective member assembly comprising:
a protective member in which a wiring member can be routed; and
a binding member capable of binding the wiring member, which is routed inside the protective member, to the protective member, wherein
the protective member includes:
a main body forming a routing space in which the wiring member is routed and having an opening that is open to one side in a first direction in the routing space;
an insertion hole which is formed to penetrate the main body and through which the binding member is inserted across inside and outside of the routing space;
a temporary retention notch which is formed in a recessed shape at an end of the main body on the opening side in the first direction and through which the binding member is inserted in a state where the binding member is inserted through the insertion hole; and
a temporary retention projection that is formed so as to protrude from the main body toward the temporary retention notch and that hooks and temporarily retains the binding member in a state where the binding member is inserted through the temporary retention notch.

7. A protective member comprising:
a main body forming a routing space in which the wiring member is routed and having an opening that is open to one side in a first direction in the routing space;

an insertion hole that is formed to penetrate the main body and through which a binding member can be inserted across inside and outside of the routing space;

a temporary retention notch which is formed in a recessed shape at an end of the main body on the opening side in the first direction and through which the binding member can be inserted in a state where the binding member is inserted through the insertion hole; and a temporary retention projection that is formed so as to protrude from the main body toward the temporary retention notch and capable of hooking and temporarily retaining the binding member in a state where the binding member is inserted through the temporary retention notch.

* * * * *